(12) United States Patent
Kim et al.

(10) Patent No.: US 8,736,899 B2
(45) Date of Patent: May 27, 2014

(54) COLOR TRANSLATION METHOD FOR COLOR-SPACE WITH WIDE-COLOR RANGE

(75) Inventors: Yun-tae Kim, Suwon-si (KR); Heui-Keun Choh, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 974 days.

(21) Appl. No.: 11/889,995

(22) Filed: Aug. 17, 2007

(65) Prior Publication Data
US 2008/0043270 A1    Feb. 21, 2008

(30) Foreign Application Priority Data
Aug. 18, 2006 (KR) .................. 10-2006-0078401

(51) Int. Cl.
*H04N 1/60* (2006.01)
*G06K 1/00* (2006.01)

(52) U.S. Cl.
USPC ............ 358/1.9; 358/518; 358/520; 358/515; 358/504; 358/525; 382/162; 382/167

(58) Field of Classification Search
USPC ............................ 358/1.9, 518; 382/162, 167
See application file for complete search history.

(56) References Cited

U.S. PATENT DOCUMENTS

| | | | | |
|---|---|---|---|---|
| 7,710,600 | B2 * | 5/2010 | Miyahara et al. ............. | 358/1.9 |
| 2003/0012427 | A1 * | 1/2003 | Martinez-Uriegas et al. ............................ | 382/162 |
| 2005/0024652 | A1 * | 2/2005 | Gondek ......................... | 358/1.9 |
| 2006/0087665 | A1 * | 4/2006 | Wang ............................. | 358/1.9 |

FOREIGN PATENT DOCUMENTS

| | | |
|---|---|---|
| JP | 2001-203904 | 7/2001 |
| JP | 2003-209706 | 7/2003 |
| JP | 2004-201184 | 7/2004 |
| JP | 2004-260572 | 9/2004 |
| JP | 2005-47067 | 2/2005 |

* cited by examiner

*Primary Examiner* — Quang N Vo
(74) *Attorney, Agent, or Firm* — Staas & Halsey LLP

(57) ABSTRACT

A color conversion method for wide-gamut color spaces, in which color conversion is performed without gamut clipping so that data corresponding to a predetermined wide-gamut color space can be directly output by a display device that supports a different wide-gamut color space from the predetermined wide-gamut color space, and which maintains characteristics of the predetermined wide-gamut color space. The color conversion method includes converting data of a predetermined wide-gamut color space into data of the RGB color space, determining whether the RGB data is outside the gamut of the RGB color space, extending the RGB data and clipping the extended RGB data if the RGB data is outside the gamut of the RGB color space, and dividing the clipped RGB data into a number of regions and performing a mapping operation in units of regions.

6 Claims, 4 Drawing Sheets

COLOR TRANSLATION METHOD FOR COLOR-SPACE WITH WIDE-COLOR RANGE

CROSS-REFERENCE TO RELATED APPLICATION

This application claims priority from Korean Patent Application No. 10-2006-0078401 filed on Aug. 18, 2006 in the Korean Intellectual Property Office, the disclosure of which is incorporated herein by reference in its entirety.

BACKGROUND OF THE INVENTION

1. Field of the Invention

The present invention relates to a color conversion method for a color display device, and, more particularly, to a color conversion method which can be used for direct printing by a color display device using a wide-gamut color space.

2. Description of the Related Art

Color display devices using a wide-gamut color space may directly print color image data such as JPEG files without using another device (e.g., a PC), as in the case when a memory card storing a number of images is inserted into a color printer, and the images in the memory card are directly printed by the color printer. This type of printing is referred to as "direct printing".

In the case of using a direct-printing function provided by a color display device using a wide-gamut color space, YCC data such as JPEG data, which is wide-gamut image data, is converted into RGB data by multiplying the YCC data by a 3×3 matrix and clipping the result of the multiplication to the range of 0 to 255. Thereafter, the RGB data is converted into CMY data using an RGB-to-CMY lookup table (LUT) so as to be able to be printed by a color display device.

FIG. 1 is a diagram for explaining a conventional method of outputting an image using a direct-printing function of a color printer. Referring to FIG. 1, encoded YCC data 12 in a JPEG file 11 created using a camera 10 is converted into RGB data 14 using a 3×3 YCC-to-RGB conversion matrix, as indicated by Equation (1) below.

$$\begin{bmatrix} R \\ G \\ B \end{bmatrix} = \begin{bmatrix} 1 & 0 & 1.402 \\ 1 & -0.344136 & -0.714136 \\ 1 & 1.772 & 0 \end{bmatrix} \begin{bmatrix} Y \\ Cr \\ Cb \end{bmatrix} \quad (1)$$

Then, the RGB data 14 is converted into data 16 of the CMY color space, which is a color space used by a color printer 17, using an RGB-to-CMY LUT 15. Thereafter, the CMY data 16 is output by the color printer 16.

According to the method of FIG. 1, R, G, and B values resulting from the conversion of image data from the YCC color space to the RGB color space satisfy the following relations: $-1.201<R<1.701$; $-0.529<G<1.529$; and $-0.886<B<1.886$. However, in a conventional method of outputting YCC data, RGB data is all clipped to the range of 0 to 1 prior to the color conversion operation. Thus, it is difficult even for a display device (such as a printer) that supports a wide-gamut color space to properly represent gradations and details of wide-gamut data using a conventional method of outputting YCC data.

SUMMARY OF THE INVENTION

Aspects of the present invention provide a color conversion method for wide-gamut color spaces, in which the wide gamut color characteristics of color image data can be maintained by preventing the color image data from being clipped during the conversion of the color image data from one wide-gamut color space to another when directly printing the color image data in a display device that supports a different wide-gamut color space from that of the original color image data.

However, the aspects of the present invention are not restricted to the one set forth herein. The above and other aspects of the present invention will become apparent to one of daily skill in the art to which the present invention pertains by referencing the detailed description of the present invention given below.

According to an aspect of the present invention, there is provided a color conversion method for wide-gamut color spaces, the color conversion method including: converting data of a predetermined wide-gamut color space into data of the RGB color space; determining whether the RGB data is outside the gamut of the RGB color space; if the RGB data is outside the gamut of the RGB color space, extending the RGB data and clipping the extended RGB data; and dividing the clipped RGB data into a number of regions and performing a mapping operation in units of regions.

DETAILED DESCRIPTION OF THE EXEMPLARY EMBODIMENTS

In order to address the problems of the prior art, raw RGB data may be reset to the range of $-\alpha$ to $1+\alpha$ in order to avoid gamut clipping during the conversion of encoded YCC data in a JPEG file into RGB data. Then, the reset raw RGB data may be divided into a core region and a surrounding area, and YCC data may be mapped to an 8-bit RGB value using a nonlinear function. In this manner, the characteristics of YCC data can be maintained even after the conversion of the YCC data into RGB data. Thus, it is possible to benefit from a wide-gamut color space, e.g., the YCC color space, even after the conversion of RGB data into CMY data that can be readily output by a display device.

Figure 1:
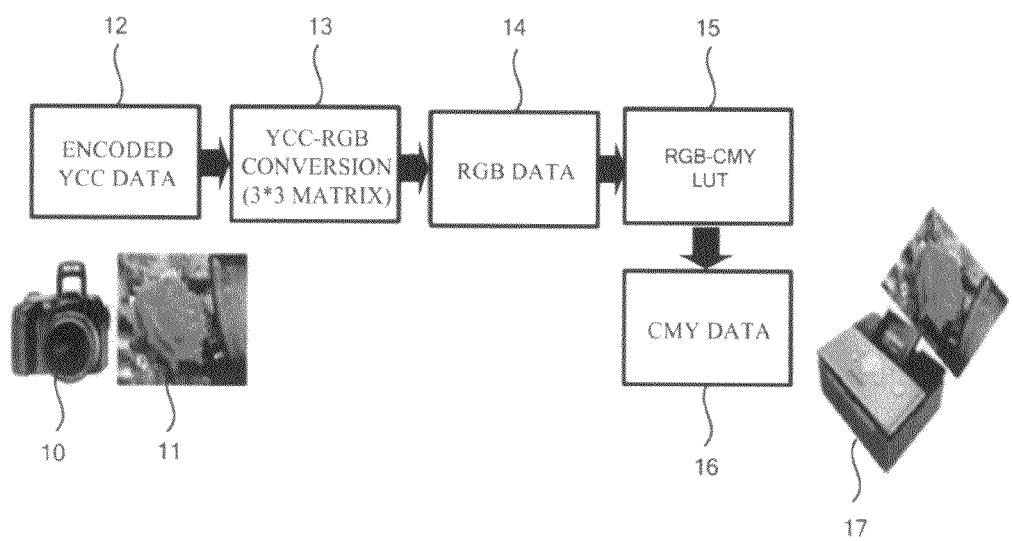
FIG. 1 is a diagram for explaining a conventional method of outputting an image using a direct-printing function of a color printer.
Figure 2:
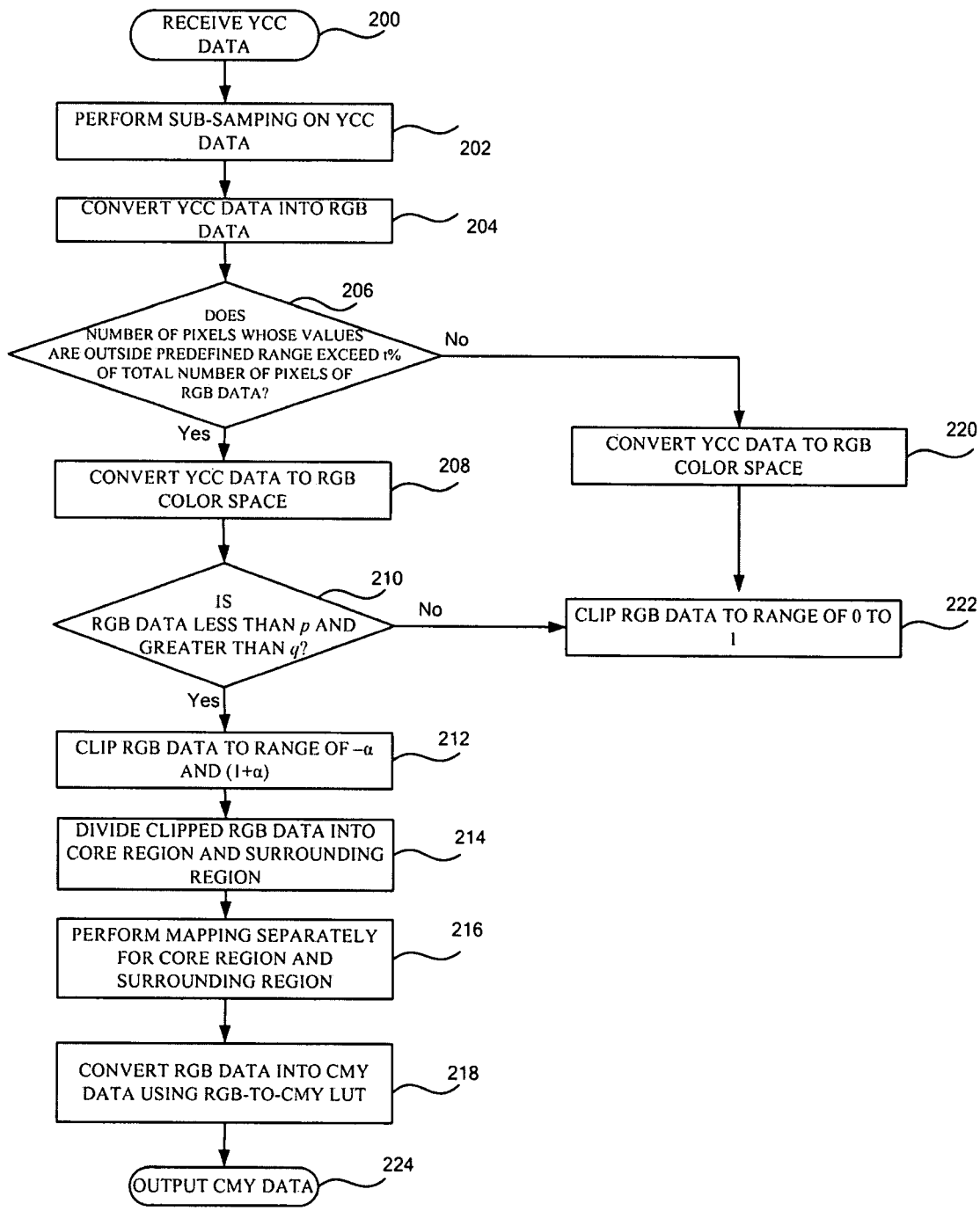
FIG. 2 is a flowchart illustrating a color conversion method for wide-gamut color spaces according to an embodiment of the present invention.

FIG. 2 is a flowchart illustrating a color conversion method for wide-gamut color spaces according to an embodiment of the present invention. Referring to FIG. 2, input YCC data such as a JPEG file is received (200). The YCC color space is wider than the RGB color space.

In order to convert the input YCC data into RGB data, a sub-sampling operation is performed on the input YCC data (202).

YCC data resulting from the sub-sampling operation is converted into RGB data using a 3×3 YCC-to-RGB conversion matrix (204). The 3×3 YCC-to-RGB conversion matrix may be represented by Equation (1). RGB data obtained by converting image data from the YCC color space to the RGB color space using Equation (1) satisfies the following relations: $-1.201<R<1.701$; $-0.529<G<1.529$; and −0.886<B<1.886. The ranges of R, G, and B values obtained by converting YCC data to the RGB color space using Equation (1) may slightly vary according to Equation (1), and may not necessarily be restricted to the range of 0 to 1. However, in a conventional method of outputting YCC data, RGB data is indiscriminately clipped to the range of 0 to 1, and the YCC-to-RGB color conversion is performed. Therefore, it is almost impossible to properly represent gradations and details of YCC data when outputting the YCC data using a printer that supports a CMY wide-gamut color space. In contrast, according to the embodiment of FIG. 2, a YCC-optimum-mapping method is used, thereby making the most use of a wide-gamut color space, i.e., the YCC color space. The YCC-optimum-mapping method will be described in detail later.

It is determined whether the number of pixels whose values are not within the range of 0 to 1 exceeds t % of the total number of pixels of the RGB data obtained by the conversion performed in operation 204 (206), where t is a threshold for deciding whether to use the YCC-optimum-mapping method or a conventional YCC-processing method, and may be determined through system settings or user settings. The range of 0 to 1 is a normalized range of the RGB color space. Pixels whose values are not within the range of 0 to 1 correspond to pixels of a wide-gamut color space that are outside the RGB color space. If the RGB data obtained by the conversion performed in operation 204 is within the range of 0 to 1, it is determined that the input YCC data has been converted into RGB data with none of the input YCC data clipped. Thus, the input YCC data is processed using the conventional YCC-processing method (220 and 222).

However, if the RGB data obtained by the conversion performed in operation 204 is outside the range of 0 to 1, it is determined that some of the input YCC data has been clipped during the conversion of the input YCC data into RGB data. Thus, the input YCC data is processed using the optimum YCC-mapping method (208 through 216).

If it is determined in operation 206 that the number of pixels whose values are not within the range of 0 to 1 is less than t % of the total number of pixels of the RGB data obtained by the conversion performed in operation 204, the input YCC data is processed using the conventional YCC-processing method (220 and 222). Specifically, the input YCC data is converted to the RGB color space (220). Thereafter, RGB data obtained by the conversion performed in operation 220 is clipped to the range of 0 to 1 (222). Thereafter, the clipped RGB data is converted to the CMY color space using an RGB-to-CMY lookup table (LUT) (218).

In contrast, if it is determined in operation 206 that the number of pixels whose values are not within the range of 0 to 1 exceeds t % of the total number of pixels of the RGB data obtained by the conversion performed in operation 204, the input YCC data is processed by performing the YCC-optimum-mapping method.

Specifically, the input YCC data is converted to the RGB color space (208). Thereafter, it is determined whether RGB data obtained by the conversion performed in operation 208 is less than p and greater than q (210). That is, it is determined whether the input YCC data has been shifted upward or downward in the RGB color space by the conversion performed in operation 208. Referring to RGB data within the range of 0 to 1, portions which correspond to black or white and whose values are less than p and greater than q may be processed using the conventional YCC-processing method (220 and 222) in order to optimize the representation of black and white.

If the RGB data obtained by the conversion performed in operation 208 is all less than p and greater than q, the corresponding RGB data is clipped to the range of 0 to 1 (222). In contrast, if the RGB data obtained by the conversion performed in operation 208 is neither less than p nor greater than q, the corresponding RGB data is clipped to the range of −α to 1+α (212). Thereafter, the clipped RGB data obtained in operation 212 is divided into a core region and a surrounding region (214). Thereafter, a mapping operation is performed on the clipped RGB data by applying different mapping functions to the core region and the surrounding region (216).

Thereafter, RGB data resulting from the mapping operation is converted to the CMY color space using an RGB-to-CMY LUT (218). Thereafter, CMY data obtained by the conversion performed in operation 218 is output (224).

Figure 3:
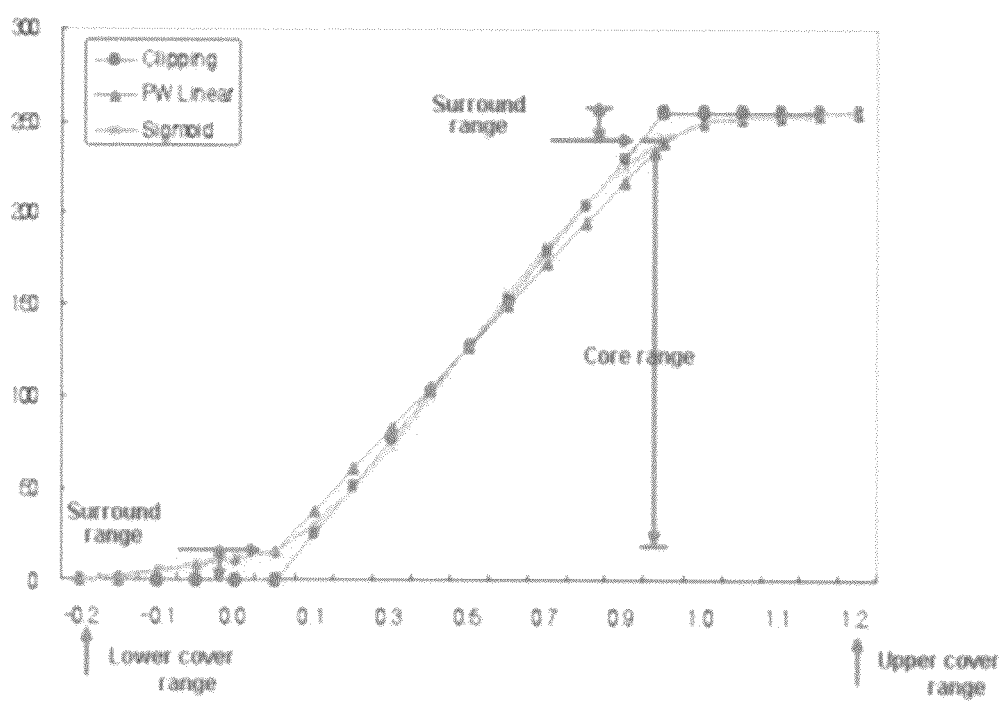
FIG. 3 is a graph for explaining a YCC-to-RGB mapping function used in the present invention.

FIG. 3 is a graph for explaining a YCC-to-RGB mapping function used in the present invention. YCC-optimum-mapping method will hereinafter be described in detail with reference to FIG. 3.

Referring to FIG. 3, a vertical axis represents color values, and particularly, 8-bit color values (i.e., 256 colors) ranging from 0 to 255, and a horizontal axis represents color space values. In general, a color space is normalized to the range of 0 to 1. In contrast, according to the embodiment of FIG. 2, the range to which a color space is normalized may be extended to ±α.

According to the embodiment of FIG. 2, input YCC data is converted into RGB data using Equation (1), and it is determined whether to use the YCC-optimum-mapping method or a conventional YCC-processing method according to the characteristics of the RGB data.

In the case of using the YCC-optimum-mapping method, an RGB data range for clipping, i.e., [−α, 1+α], is determined. Linear conversion may be performed on RGB data within the range of −α and 0 or within the range of 1 and 1+α, as indicated by Equation (2):

$$Out_i = \begin{cases} \dfrac{n' In_i + \alpha'}{\alpha}, & \text{for } -\alpha \le In_i < 0 \\ \dfrac{n' In_i - 1'}{\alpha} + 255 - n', & \text{for } 1 \le In_i \le 1 + \alpha \end{cases} \quad (2)$$

where α is a constant for clipping RGB data and n is a constant for dividing RGB data into a core region and a surrounding region.

Color conversion may be performed on RGB data within the range of 0 to 1 using a linear function or another nonlinear function. According to the embodiment of FIG. 2, color conversion may be performed on RGB data within the range of 0 to 1 using a sigmoid function, as indicated by Equation (3):

$$Out_i = S_{LUT}(m \cdot In_i) \quad (3)$$

$$S_{LUT}(n) = \sum_{n=0}^{n-m} \dfrac{1}{\sqrt{2\pi}} e^{((1.00x/m-x)/2\sigma)}$$

where $S_{LUT}(n)$ indicates a sigmoid LUT function, m indicates the size of an LUT, $x_0$ is an average, and σ indicates the standard deviation. Referring to the graph illustrated in FIG. 3, a curve "Clipping" indicates a color conversion method which includes clipping YCC data to an RGB gamut and then performing color conversion on the YCC data, the curve "PW Linear" indicates a color conversion method which includes dividing RGB data into a core region and a surrounding region, and performing a linear conversion on the core region and the surrounding region, respectively, and the curve "Sigmoid" indicates a color conversion method which includes dividing RGB data into a core region and a surrounding region, performing a linear conversion operation on the surrounding region using a linear conversion function and performing a nonlinear conversion operation on the core region using a nonlinear function such as a sigmoid function.

The color conversion method of the embodiment of FIG. 2 may be represented by the combination of the curve "PW Linear" and the curve "Sigmoid".

Referring to FIG. 3, it is possible to prevent color components outside a predefined range from being mapped to the same color by precisely representing a wide gamut of colors in a surrounding region using the color conversion method of the embodiment of FIG. 2.

Figure 4A:
FIG. 4 shows the comparison between an image obtained using the present invention with an image obtained using the prior art.
Figure 4B:

FIG. 4 compares an image obtained using the present invention with an image obtained using the prior art. Specifically, FIG. 4(a) presents an image obtained using the prior art, and FIG. 4(b) presents an image obtained using the present invention.

In the case of printing an image using a color printer that supports a wide-gamut color space such as the YCC color space and using the color conversion method of the embodiment of FIG. 2, a YCC-to-RGB mapping operation is performed separately for a core region and a surrounding region, and the wide-gamut color space is not necessarily clipped to a limited range of 0 to 1. Thus, the image of FIG. 4(b) appears more natural than the image of FIG. 4(b) in terms of gradations and details. That is, it is possible to output natural images using the color conversion method of the embodiment of FIG. 2.

The present invention can be realized as computer-readable code written on a computer-readable recording medium such as a CD-ROM, a RAM, a floppy disc, a hard disc, or an optomagnetic disc.

As described above, according to the present invention, it is possible to represent all image data of a wide-gamut color space by avoiding the clipping of color components even when outputting the image data of the wide-gamut color space by a wide gamut display device.

In addition, according to the present invention, it is possible to properly represent gradations and details of wide-gamut color data, and thus to output high quality images.

While the present invention has been particularly shown and described with reference to exemplary embodiments thereof, it will be understood by those of ordinary skill in the art that various changes may be made in the form and details without departing from the spirit and scope of the present invention as defined by the following claims.

What is claimed is:

1. A color conversion method for wide-gamut color spaces in a color display device, comprising:
converting data of a predetermined wide-gamut color space into data of a RGB color space;
determining, using a processor, whether a ratio of a number of pixels whose values are not within the range of 0 to 1 to a total number of pixels of the converted RGB data exceeds a predetermined value;
extending the RGB data and clipping the extended RGB data to an extended range when the ratio of the number of pixels whose values are not within the range of 0 to 1 to the total number of pixels of the RGB data exceeds the predetermined value;
clipping the RGB data to a normalized range, if the ratio does not exceed the predetermined value; and
dividing the clipped RGB data into a number of regions and performing a mapping operation in units of the regions;
wherein, the clipping of the extended RGB data further comprises,
determining whether the RGB data corresponds to a shift to a black or white area, if it is determined that the ratio exceeds the predetermined value;
clipping the RGB data to the normalized range, if it is determined that the RGB data corresponds to the shift to the black or white area; and
extending the RGB data and clipping the extended RGB data, if it is determined that the RGB data does not correspond to the shift to the black or white area.

2. The color conversion method of claim 1, wherein the regions comprise a surrounding region which corresponds to an extended portion of the RGB data, and a core region which corresponds to the original RGB data.

3. The color conversion method of claim 2, further comprising performing a mapping operation for the surrounding region using a linear function and performing a mapping operation for the core region using a sigmoid function.

4. The color conversion method of claim 1, wherein in the performing of the mapping operation in units of regions, a different mapping operation is performed for each region.

5. The color conversion method of claim 4, wherein the different mapping operation performed for each region includes a linear function and a non-linear function.

6. A color conversion method for wide-gamut color spaces in a color display device, the method comprising:
converting data of a wide-gamut color space into data of an RGB color space;
determining, using a processor, whether a ratio of pixels whose values are not within a range of the RGB color space to a total number of pixels of the converted RGB data exceeds a predetermined threshold;
clipping the RGB data to an extended range including portions outside of the RGB color space when the ratio of pixels whose values are not within the range of the RGB color space to the total number of pixels of the converted RGB data exceeds the predetermined threshold, dividing the clipped RGB data into a plurality of regions, and mapping the clipped RGB data by performing a mapping operation for the surrounding region using a linear function and performing a mapping operation for the core region using a non-linear function,
and, alternatively, when the ratio of pixels whose values are not within the range of the RGB color space does not exceed the predetermined threshold, converting the wide-gamut color space data into data of the RGB color space without extending the RGB data and clipping all of the converted data to within the range of the RGB color space,
wherein the clipping comprises:
determining whether the RGB data corresponds to a shift to a black or white area, if it is determined that the RGB data is outside the gamut of the RGB color space;
clipping the RGB data to a normalized range when it is determined that the RGB data corresponds to the shift to the black or white area; and
clipping the RGB data to the extended range when it is determined that the RGB data does not correspond to the shift to the black or white area.

* * * * *